April 21, 1931. O. G. ASHER 1,801,711
COMBINED TENT AND GARAGE
Filed May 23, 1927 2 Sheets-Sheet 1
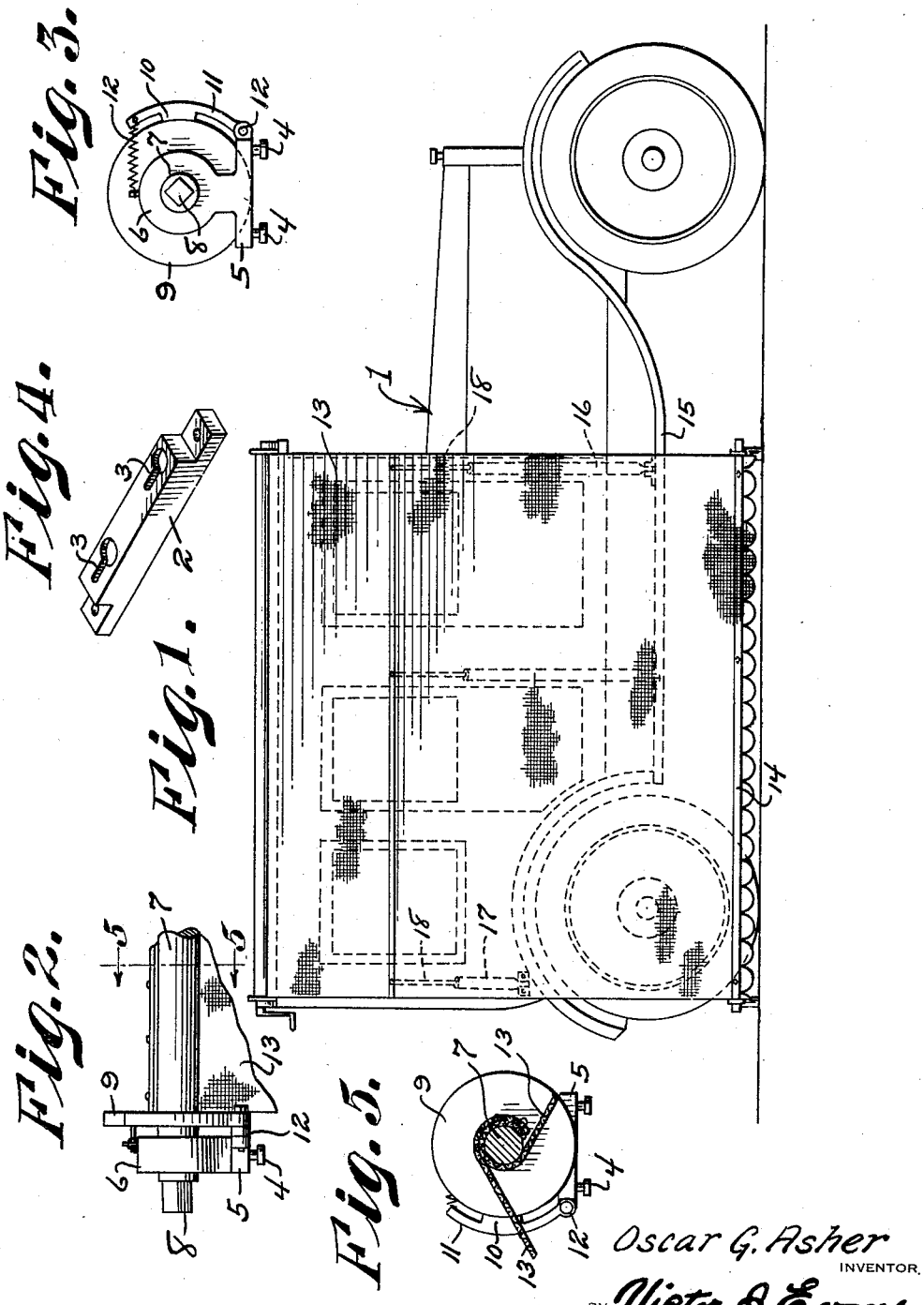
Oscar G. Asher
INVENTOR.
BY Victor J. Evans
ATTORNEY
WITNESS: 

April 21, 1931. O. G. ASHER 1,801,711
COMBINED TENT AND GARAGE
Filed May 23, 1927 2 Sheets-Sheet 2
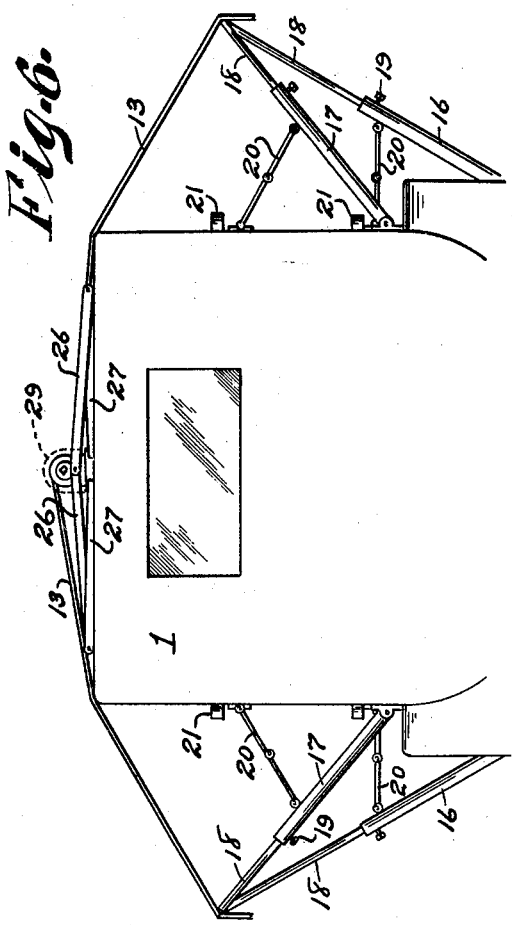
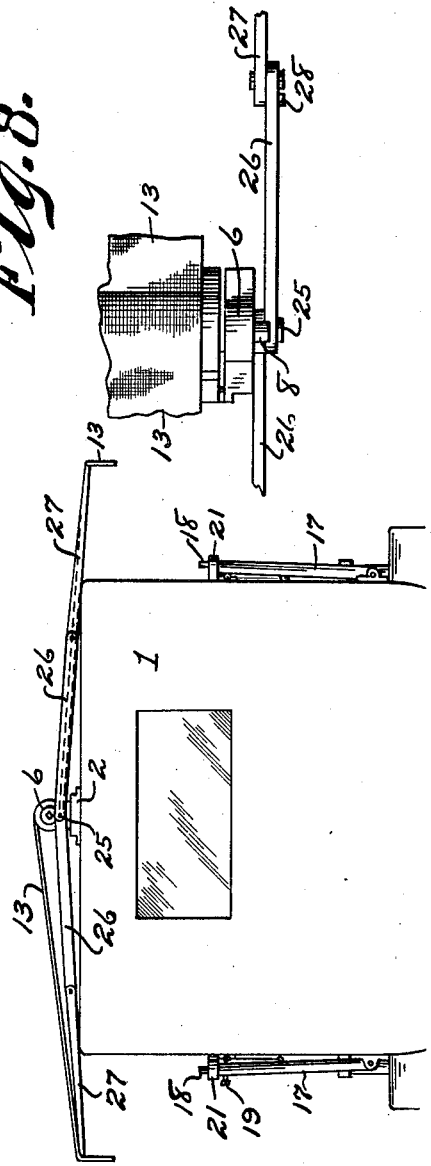
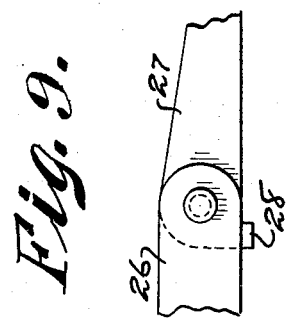
Oscar G. Asher
INVENTOR
BY Victor J. Evans
ATTORNEY
WITNESS:

Patented Apr. 21, 1931

1,801,711

UNITED STATES PATENT OFFICE

OSCAR G. ASHER, OF WELAKA, FLORIDA

COMBINED TENT AND GARAGE

Application filed May 23, 1927. Serial No. 193,613.

My present invention has reference to an attachment for automobiles and aims to provide a protector cover for the top of the automobile, an awning for protecting the occupants of the automobile from weather conditions, or a canopy for also protecting the occupants, insuring privacy of the occupants and for other purposes.

A further object is the provision of a device for this purpose that is removably associated with the automobile and which may be readily adjusted to any of its mentioned positions.

A still further object is the provision of an attachment for this purpose that can be readily attached to or removed from the top of any ordinary automobile or like vehicle body, and which comprises few simple parts.

To the attainment of the foregoing and other objects which will present themselves as the nature of the invention is better understood, the improvement also resides in certain other novel features of construction, combination and operative association of parts, a satisfactory embodiment of which is disclosed by the accompanying drawings.

In the drawings:

Figure 1 is a side elevation of an automobile equipped with the improvement.

Figure 2 is an elevation looking toward one end of the shaft to which the fabric sheets are attached and showing the bearing for the said end of the shaft.

Figure 3 is an end view of the device disclosed by Figure 2.

Figure 4 is a perspective view of one of the fixed plates on the top of the automobile.

Figure 5 is a sectional view approximately on the line 5—5 of Figure 3.

Figure 6 is a rear elevation of the automobile showing the improvement arranged as a canopy.

Figure 7 is a similar view but showing the improvement arranged as an awning.

Figure 8 is a fragmentary top plan view of the device as disclosed by Figures 6 and 7.

Figure 9 is a fragmentary side elevation to illustrate the hinge connection between the sheet supporting arms and the top of the automobile.

In carrying out my invention I secure at the center and ends of the top of the body of an automobile 1 transversely arranged blocks 2. Each of these blocks has at its top a pair of spaced key-hole slots 3. The key-hole slots 3 are designed to receive therein and to have the walls thereof frictionally engage with headed elements 4 that extend from the base members 5 of bearings 6. In the bearings there are journaled the ends of a shaft 7, and one end of the shaft has a squared extension 8 for engagement with the socket end of a crank handle, whereby the shaft may be turned. The shaft, inward of the bearings has secured thereon friction wheels 9, and these wheels are designed for engagement with fibre or like compressible shoes 10 on brake members 11 which are hinged, as at 12, to the base 5 of the respective bearings 6. The brake members 11 are spring influenced in the direction of the bearings, as indicated by the numerals 12. The brakes, of course, prevent the free turning of the shaft.

Fixed on the shaft are the ends of oppositely directed canvas or similar sheets 13. Preferably the sheets 13 have their outer ends provided with pockets for the reception of metal bars 14 to weight the said ends of the sheets. In the showing of the drawings I have illustrated means whereby the sheets 13 may be arranged in a position to provide a canopy for each side of the automobile. This means may comprise upper and lower tubes 16 and 17, respectively which are hingedly connected to the sides of the automobile and receive therein rods 18 that are held adjusted by binding elements 19. Sectional links 20 having rule joint members are hingedly secured to the sides of the automobile and to the respective tubular members 16 and 17. When the tubular members 16 and 17 are swung outwardly from the sides of the automobile and the rods adjusted the ends of the rods underlie and support the outer ends of the sheets 13 as disclosed by Figure 6 of the drawings and when the supporting means is not required for use the tubes 16 and 17 are swung into spring clips 21 which are also fixed to the sides of the automobile 1.

Each bearing 6 has an outwardly extending stub shaft 25 on which is journaled the inner and contacting ends of arms 26, respectively. The arms are oppositely directed and the outer end of each of the said arms has pivoted thereto a second arm or extension 27. Each extension 27 inward of its pivot has on its lower end an angle finger 28 to contact with the arms 26 and to hold the said arms in longitudinal alignment. The pivotally connected pairs of arms 26 and 27 are employed for holding the sheets 13 from contacting with the top of the machine and supporting the said sheets in canopy position as disclosed by Figure 6 and in awning position as disclosed by Figure 7.

When the fabric sheets are fully rolled on the shaft a split spring protector, indicated by dotted lines in Figure 6 of the drawings may be arranged thereover. The device may be detached from the machine by imparting a lateral movement to the bearing 6 which brings the headed elements or studs 4 out of the restricted passages of the key-hole slots 3, permitting the shaft and the sheets wound therearound to be bodily moved from the block supports 2, leaving only the said blocks on the machine.

A suitable socket wrench (not shown) may engage the end 8 of the shaft for turning the same to either wind the sheets thereon or to permit of the unwinding of the sheets therefrom.

The simplicity and advantages of my construction will, it is thought, be fully understood and appreciated by those skilled in the art to which such invention relates when the foregoing description has been carefully read in connection with the accompanying drawings. Obviously I do not wish to be restricted to the precise details herein set forth and, therefore, hold myself entitled to make such changes therefrom as fairly fall within the scope of what I claim.

Having described the invention, I claim:

1. The combination with the body of an automobile, of blocks secured thereto, bearings resting on said blocks and interengaging therewith, a shaft journaled through the bearings, friction wheels on the shaft, pivotally supported spring influenced brake members on the bearings, a fibre brake shoe on each brake member for engaging the friction wheels and oppositely directed fabric sheets having their inner ends fixedly secured to the shaft.

2. The combination with the body of an automobile, bearings removably secured on the top of the body, a shaft journaled through said bearings, a removable operating handle for the shaft, brake means holding the shaft from free turning, oppositely directed fabric sheets having their inner ends secured on the shaft and a weighted element on the outer end of each sheet.

In testimony whereof I affix my signature.

OSCAR G. ASHER.